July 4, 1950 — C. M. ANNIS — 2,513,703
MOWING MACHINE
Filed Feb. 25, 1946 — 4 Sheets-Sheet 2

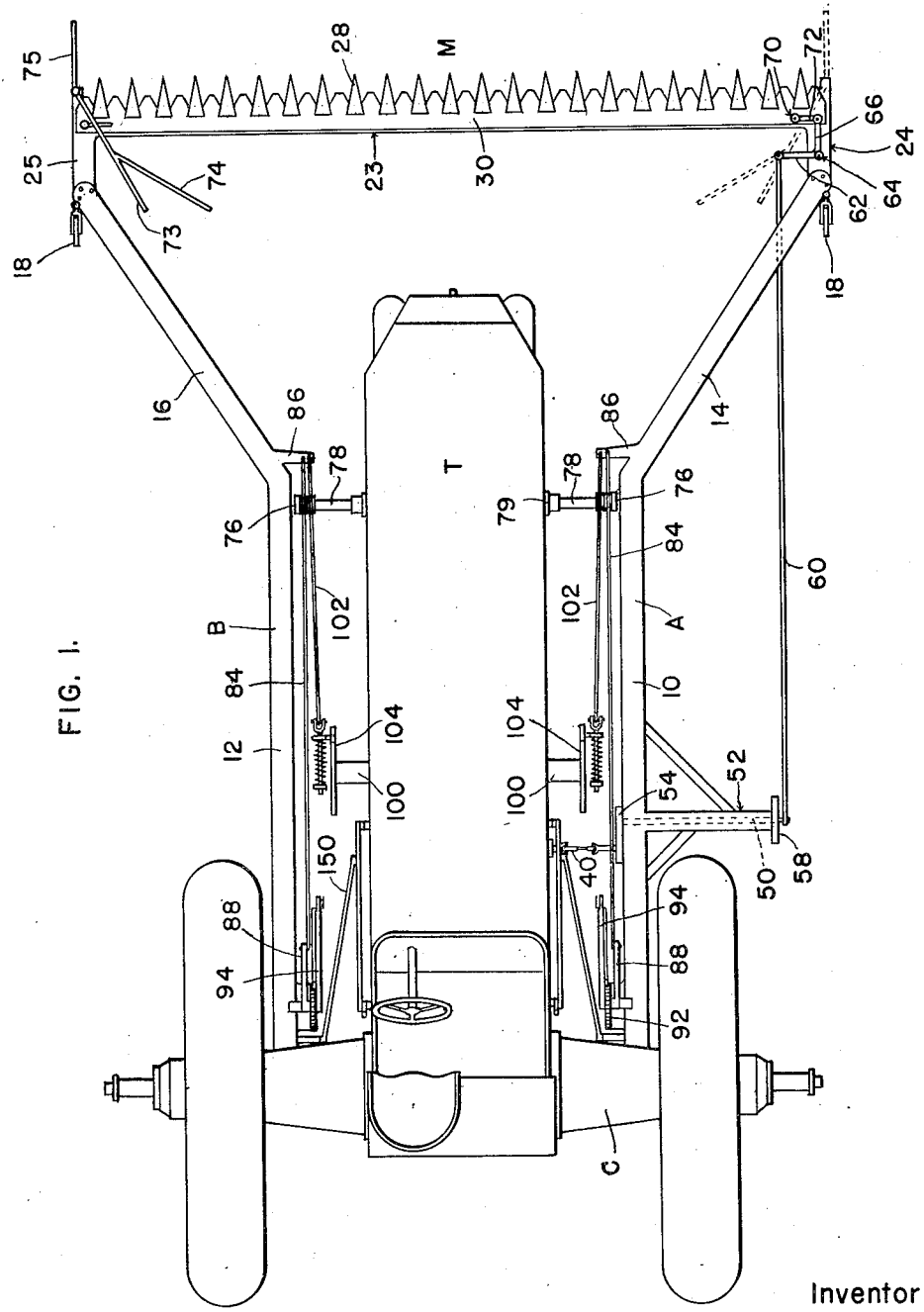

Inventor
CLYDE M. ANNIS
Cushman Darby & Cushman
Attorneys

July 4, 1950
C. M. ANNIS
2,513,703
MOWING MACHINE
Filed Feb. 25, 1946
4 Sheets-Sheet 3
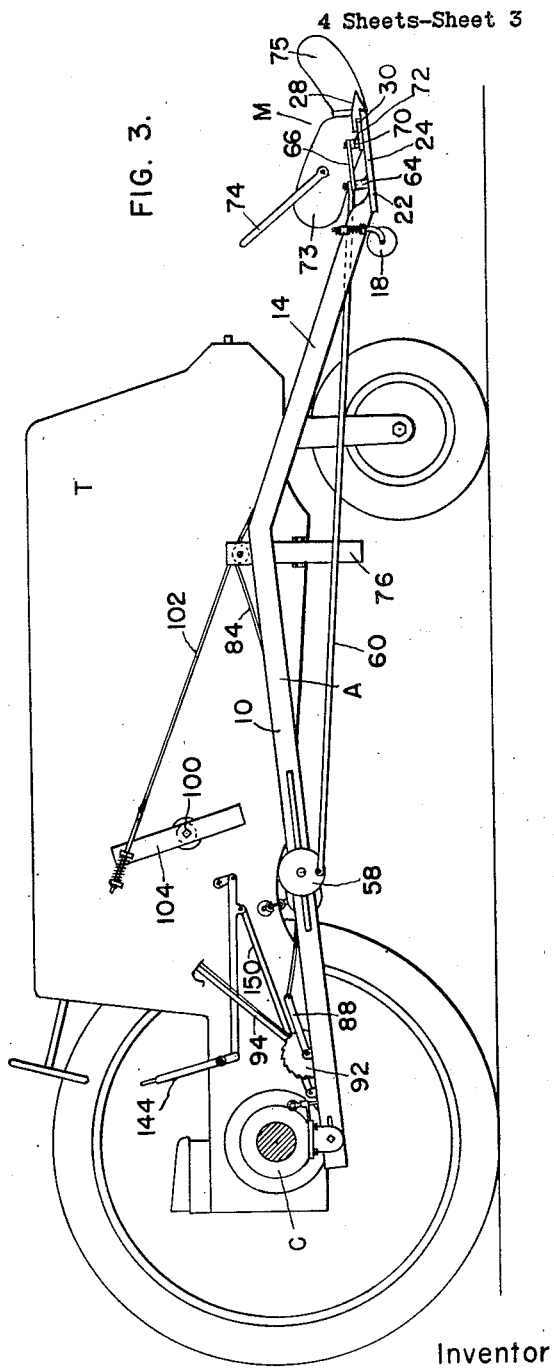
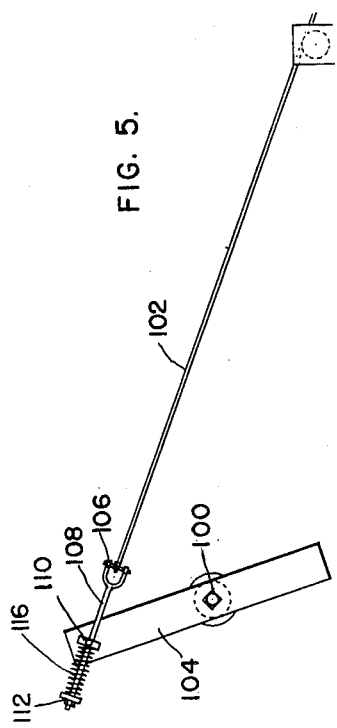
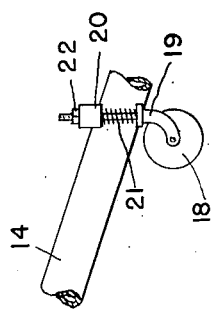
Inventor
CLYDE M. ANNIS
Cushman Darby Cushman
Attorneys

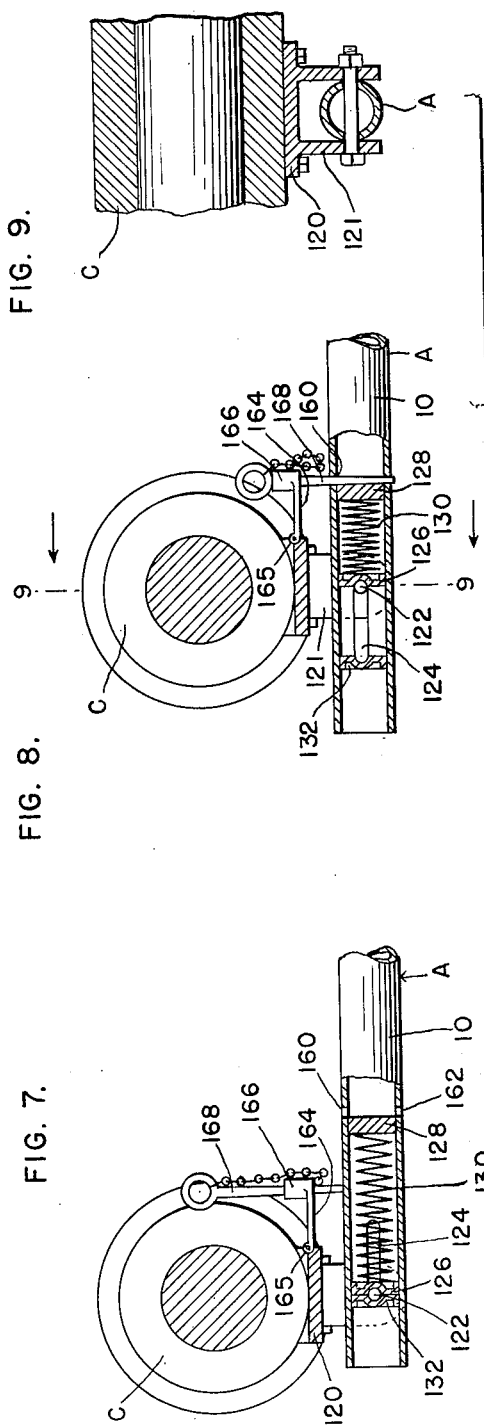

Patented July 4, 1950

2,513,703

UNITED STATES PATENT OFFICE 2,513,703

MOWING MACHINE

Clyde M. Annis, Twin Falls, Idaho

Application February 25, 1946, Serial No. 649,803

4 Claims. (Cl. 56—25)

The present invention relates to mowing machines comprising a power-driven vehicle such as a tractor of standard or well-known design, with associated equipment which is constructed and arranged for convenient assembly on the tractor, and is operated to perform mowing of various crops. The assembly is conveniently removable from the tractor when the latter is to be used for other purposes.

A principal object of the invention is to provide such an arrangement of parts for attachment to a vehicle, characterized by simplicity and by the ease with which it may be assembled and connected. Another object of the invention is to provide such apparatus which accommodates itself during operation to the rough terrain of the fields. A further object of the invention is to provide such apparatus capable of being adjusted into inoperative position when it is desired to drive the vehicle through the field prior to, during, or after mowing operations.

Another object of the invention is to provide such an apparatus which will not be damaged by encountering heavy objects in the field, provision being made to disconnect the power of the vehicle when such objects are encountered by the cutting mechanism.

Another object of the invention is to provide a mowing machine driven in such a manner that the cut crops are not likely to interfere with driving connections between the source of power and the cutting mechanisms.

Another object of the invention is to provide an arrangement for driving the cutting arm of the mowing assembly from a power shaft of the vehicle or tractor, the mounting of the cutting mechanisms and the power connections being so arranged as to reduce vibration and wear of the parts to a minimum.

Various other objects and advantages of the invention will be apparent as the description progresses. In the drawings, which are illustrative of one arrangement of the equipment which may be employed to practice the invention, and which are not intended to restrict the invention to any precise form:

Figure 1 is a top plan view showing the arrangement of the equipment on a standard type tractor.

Figure 3 is a view similar to Figure 2, but showing the mowing mechanism elevated for travel by the tractor prior to, between and after mowing operations.

Figure 5 is a detailed view of a part of the equipment employed to raise the mowing assembly from operative to inoperative position.

Figure 6 is a view of a castor and its mounting, used to support the mowing assembly.

Figures 7, 8 and 9 are views of the manner in which the side arms of the mowing assembly are supported on and below the rear axle housing of the vehicle.

Figure 10 is a detailed view showing the pulley supporting bracket which forms a part of the support for the forward ends of the side arms of the equipment.

Figure 11 is a detailed view of the flexible and extensible shaft connection for supplying power to drive the reciprocating cutting bar of the mowing assembly.

Figure 2:
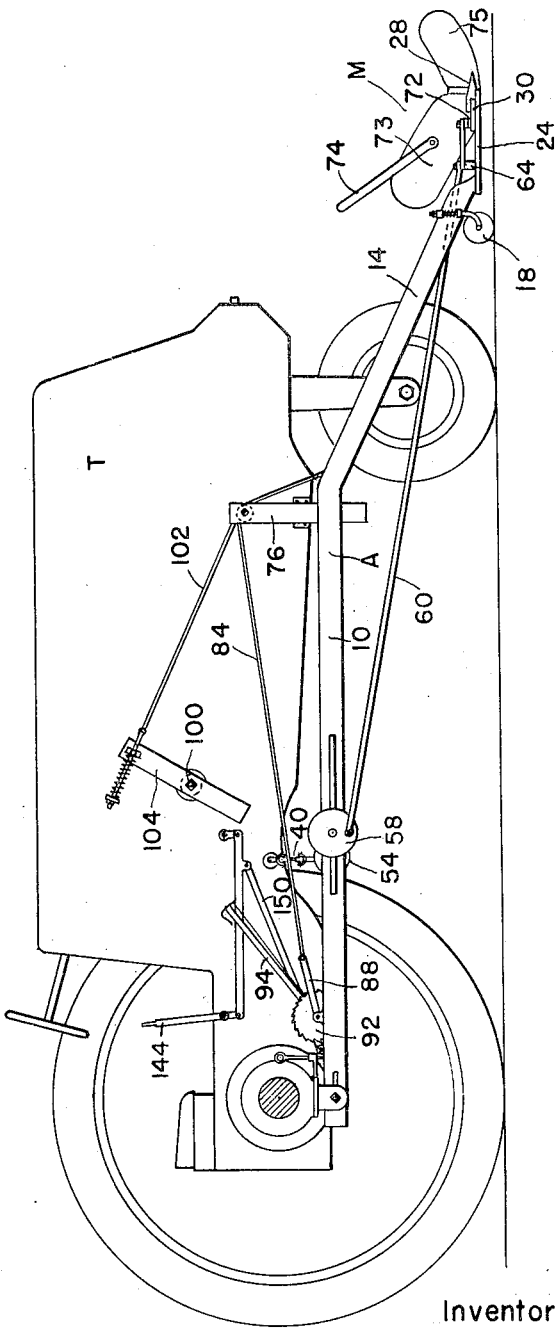
Figure 2 is a side elevational view of the tractor and attached equipment, showing the cutting mechanism in operative or mowing position.

Referring to Figures 1, 2 and 3, the vehicle or tractor T has the usual body or frame supported on wheels, as shown. The equipment of the present invention includes a cutting or mowing assembly generally designated by the letter M which is positioned across the front of the tractor, and spaced forwardly thereof, as best illustrated in Figure 1. It will be evident that the mowing assembly is unobstructed by any other part of the mechanism employed, so that all types of crops, both heavy and light, may be handled. The mowing assembly M is supported by a pair of side arms A and B, which are an important part of this invention and are adapted to be removably attached to the vehicle or tractor. Arms A and B comprise straight portions 10 and 12 respectively, which are positioned on opposite sides of the tractor body and extend generally parallel to the length thereof. The rearward ends of the arms 10 and 12 are yieldingly and pivotally connected below the rear axle housing C of the tractor, in a manner hereinafter described. The forward ends of the arms A and B comprise outwardly and downwardly extending portions 14 and 16 which may be integral with the portions 10 and 12 or may be detachably but rigidly secured thereto. The arms A and B are supported for vertical movement or adjustment on the tractor frame as hereinafter described, and when positioned in their lower or operative position, as in Figure 2, they are supported by castor wheels 18 which are carried by curved upwardly extending shafts 19 adjustably carried in brackets 20 on the lower ends of the arm portions 14 and 16 as illustrated in Figure 6. It will be understood that the castor wheels 18 are of the type which are freely pivoted on their vertical axis, and they may be yieldingly mounted on the arms 14 and 16 by means of spring 21 to ease the transit of the mowing assembly over uneven ground. The vertical shafts on which the castor wheels 18 are carried may be adjusted by the nut 22 or in any conventional manner in the brackets 20 in order to set or adjust the desired length of the crop to be cut, the cutting mechanism being thus adjustably spaced from the ground.

The cutting mechanism comprises the usual shoe 23 having rearwardly extending end sections 24 and 25 on opposite sides of the machine, these end portions being attached to and supported by the lower ends of the portions 14 and 16 of the side arms. The shoe includes the usual board extending across the machine between the arms 25 and 24, having split fingers 28 on its front edge. Arranged for reciprocating movement in the shoe as it is conventional in mowing machine cutting mechanisms is the cutter bar 30, same being equipped with suitable cutting teeth as is well known in the art.

On one side of the mechanism, preferably the right side, mechanism is provided to reciprocate the cutter bar 30 during the mowing operation, this being accomplished by suitable connections from a power shaft of the tractor, as now described. Referring to Figure 1, a flexible and extensible shaft 40 is shown connected with and leading from a suitable power shaft of the tractor, such as the belt pulley shaft thereof. As shown in Figure 11, this shaft has a known type of double pivoted or universal inner coupling as at 42 and a similar outer coupling as at 44, the shaft portion 46 intermediate these couplings comprising two telescoping parts slidable with respect to one another but adapted to impart rotation from one to the other, as is well known in the art. By the use of such a shaft, the vertical and horizontal movements which the arm A is capable of may take place without breaking the connection from the source of power to the cutting arm of the mowing assembly at any time.

The connecting shaft 40 drives a short shaft 50 carried in a housing or bearing sleeve 52 extending outwardly from the rear portion 10 of the arm A, this drive being through suitable reduction gearing in the gear box 54 also carried by the arm A. The outer end of the shaft 50 is secured to and rotates a disk 58. A relatively long pitman 60 is eccentrically connected at its rearward end to the disk 58. At its forward end, the pitman is pivoted to one arm 62 of a bell-crank lever which in turn is pivoted on an upwardly extending post 64 which is integral with the rearwardly extending portion 22 of the shoe. This pivot is preferably of the well-known ball and socket type to permit various movements of the parts at the pivot point. The other arm 66 of the bell-crank lever is pivoted by link 72 to a post 70 which is integral with and extends upwardly from the cutter bar 30, and this pivoted connection may be through a short link 72 (Fig. 1) in order to translate the circular movement of the forward end of the arm 66 of the bell-crank lever to reciprocating movement by the cutter arm 30. Any of the above pivots in addition to that at the forward end of the pitman, may be of the ball and socket type, as necessary.

It will be apparent from Figure 1 that the drive for the cutter arm is so disposed with relation to the cutting portions of the mowing assembly, that there is little likelihood of fouling the driving mechanism by the cut crop. That is, the cutting mechanisms are positioned to extend entirely across the front of the vehicle, being supported at widely spaced points, and by reason of the length of the portion 50 of the drive shaft, and the supporting journal 52, the pitman 60 is positioned where it will be free from interference from the cut material. It will also be noted in Figures 2 and 3 that the pitman is of great length, extending from a point just forward of the rear axle housing C of the tractor to the mowing assembly which is located some distance in advance of the forward end of the tractor. The relatively long pitman rod causes a very even reciprocating operation of the cutter bar, and undesirable vibrations are eliminated which contributes materially to reducing the wear on the cutting and wearing parts of the mower assembly.

As best shown in Figure 1, the mowing assembly is provided with the conventional grass board 73, grass stick 74 and divide 75, attached to the shoe structure by suitable brackets. The divide separates the cut from the uncut crop, while the board and stick lay the crop over into the center of the path of the tractor.

As stated before, the arms A and B which support the mowing assembly at their forward ends, are pivotally mounted beneath a rear axle housing C and the details of this mounting will be hereinafter described. The purpose of this pivotal mounting is to permit the mowing assembly to be elevated from the operating position shown in Figure 2 to the housing position of Figure 3 and this movement is accomplished by means now to be described. On each side of the tractor, there is a vertical plate or post 76 against which the inner faces of the arms A and B are adapted to bear, said plate 76 constituting guides to brace the arms A and B against side swinging during operation of the machine or during adjustment of the arms. The guide plates 76 are carried on suitable extensions 78 which in turn are removably but rigidly secured at their inner ends to the cultivator bracket 79 of the tractor, as shown in detail in Figure 10. At the upper ends of the guide plate 76, and on the inner faces thereof, there are a pair of pulleys 80 and 82. The outer pulley is adapted to receive a flexible rope or wire 84 which is connected at its forward end to a bracket 86 extending inwardly from the forward position 14 of the arm A. The rear end of the rope or wire 84 connects with a lever 88 (Figure 4) which is integral with a shaft 90 carried by brackets extending upwardly from the rear portion 10 of the arm A. A fixed toothed sector plate 92 is also attached to the arm A. The sector plate has peripheral ratchet teeth therein, which are adapted to engage a conventional retractable pawl carried on a hand lift lever 94 which is also connected for movement with the rock shaft 90. It will be understood that the hand lift mechanisms just described, including the connections from the hand lift lever to the forward end 14 of the arm A may be duplicated on the opposite side of the machine for the arm B as shown in Figure 1. In order to manually elevate the mowing mechanism to the position of Figure 3, the operator grasps one or both of the hand levers 94, releases the pawl from engagement with the teeth of the sector 92 in a manner well known in the art, such as by pressing a button on the end of the levers, and then moves the levers rearwardly. This rearward movement turns the shaft 90 in a counterclockwise direction likewise rocking the lever 88 in that direction and the rope or wire 84 is pulled taut over the pulley 80 on the guide plate 76 thus exerting an elevating force on forward sections 14 and 16 on the arms A and B to elevate them to the position shown in Figure 3. It will be understood that the ratchet mechanism on the lever 94 will retail the mechanism in its inoperative position as long as desired, release of the ratchet permitting the apparatus to lower itself by gravity.

However, I prefer to elevate the mowing mechanism on the arms A and B automatically from a suitable power shaft of the tractor, and for this reason I have provided suitable connections between a power lift shaft 100 of the tractor and the arms A and B. These connections include a second wire line or rope 102 connected with the bracket 86 on the forward sections of the arms A and B, which line passes over the inner pulley 82 on the guide plate 76 and terminates at its rearward end in a yielding connection with a rocking arm 104 mounted for movement with the power lift shaft 100 of the tractor. As shown in detail in Figure 5, the rearward end of the line 102 is attached to an eye 106 at the forward end of a bolt 108, the bolt passing through an opening in a bracket 110 fixed on the arm 104 and terminating in a fixed head 112 on its rearward end. A spring 116 is positioned on the bolt 108 and is compressed between the fixed head 112 and the bracket 110 as the bolt moves toward the opening in said bracket.

With this arrangement, the mowing assembly may be automatically raised to an inoperative position, and lowered to operative position from a power lift shaft of the tractor, and movements of the arms and mowing assembly will be cushioned by the yielding connection shown in Figure 5. Also, when the tractor is moving over uneven ground with the mowing mechanism supported in its upper position, up and down movement of the arm due to uneven ground will be cushioned. It will be understood that suitable means are provided in the tractor mechanisms for retaining the shaft 100 in various positions, so that it may be rocked to elevate the mowing mechanism and locked to retain same in the position of elevation desired.

The yielding mounting of the rearward portions of the arms A and B are best illustrated in Figures 7 through 9 where the mounting for the right hand arm A is shown. In Figure 9, a bracket 120 having spaced plates 121 is shown attached and depending from the axle housing C. The depending plates have aligned apertures therein in which is secured a fixed pin 122. As illustrated, the rearward end 10 of the arm A is tubular in form and there are aligned slots 124 in opposite sides of the tube, the pin 122 extending through these slots. With this arrangement, a limited forward and backward movement of the arm A is permitted, as when the mowing assembly M strikes any obstruction during the mowing operation. Within the hollow portion of the rearward end of the arm A there is a sliding disk 126 having a semi-circular lateral groove in its rearward face which engages the pin 122, and between this disk and a fixed abutment 128 within the tube A is a compression spring 130. When the mowing assembly strikes an obstruction, the tube A will be moved rearwardly, but the fixed pin 122 will bear against the disk 126 and compress the spring 130, the extent of rearward movement being illustrated by a comparison of Figure 7 with Figure 8. There is also a fixed disk 132 secured near the rear end of the tube A and it likewise has a semi-circular groove extending across its forward face to fit around the fixed pin 122 in the normal position of the arm A as illustrated in Figure 7.

From the above description, it will be apparent that two types of movement of the arm A are accommodated by the manner of its connection at its rearward end to the axle housing C. First, the arm A can pivot around the pin 122 when the mowing assembly is raised or lowered by the mechanisms previously described. Second, the arms A and B are capable of longitudinal translation when the mowing assembly strikes an obstruction, same being permitted by the slots 124 in the ends of arms which permit them to move with respect to the fixed pin 122.

Figure 4:
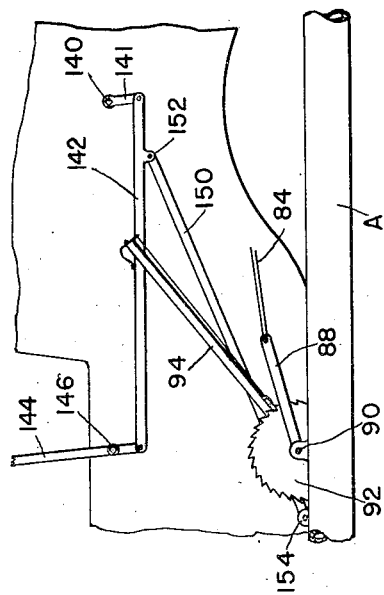
Figure 4 is a detailed view of a part of the mechanism which accomplishes disengagement of the driving connections of the tractor when a heavy object is encountered.

The above described movement of the arms A and B is utilized to disengage the power shaft for driving the tractor over the ground, when a heavy object is encountered, in order to avoid injury to the mowing mechanism, or other harmful results. Referring to Figure 4, the clutch control is illustrated as being accomplished by the turning of the shaft 140, operatively connected to the clutch of the tractor to disengage the same. The shaft 140 is operated by a link 141 secured to the shaft and in turn pivoted to a longer link 142 which is pivoted to the lower end of an operating lever 144 pivoted at 146 adjacent to the operating station of the tractor. In order to actuate the clutch control lever 141 by rearward movement of the arms A and B when an obstruction is encountered, a long connecting link 150 is provided, same being pivoted at 152 to the link 142 and at 154 to suitable brackets mounted on the upper surface of the arm A. With this construction, and when a heavy object which would damage the mowing mechanism is encountered, the arms A and B are permitted to move rearwardly, and their rearward movement causes link 150 to rock the clutch control lever 141 and disengage the driving power of the tractor.

In order to prevent the clutch from immediately becoming reengaged and before the operator shifts gear into neutral, means are provided to lock the arms A and B in their rearward position until suitably released by the operator. Referring again to Figures 7 and 8, the arm A is provided with vertically aligned openings 160 and 162 conveniently located forwardly of the abutment 128, and a bracket 164 is hinged at 165 to the top of the bracket 120 which in turn is secured to the lower part of the axle housing C. The bracket 164 has a sleeve 166 at its forward end, and a lock pin 168 normally rests in this sleeve with its lower end supported by the top surface of the arm A, at a point spaced rearwardly of the opening 160 when the arm A is in its normally operating position. When an obstruction is encountered and the arm A is forced rearwardly as previously described, the lock pin 168 drops down through the openings 160 and 162 and thus locks the arm A against return movement. With this arrangement, it will be necessary for the operator of the tractor to reach down and remove the pin 168 from the openings 160 and 162 before the arm A is permitted to resume its forward or normal position, and thus the clutch of the tractor is maintained in disengaged position until it is desired to reengage the same.

A suitable chain may be provided, as shown, to secure the pin 168 to the sleeve 166. The plate 164 which carries the sleeve 166 is pivoted at 165 in order to accommodate movements of the arm A around the pivot pin 122.

Throughout the description, it will be understood that the mechanism on only one side of the machine is described, it being understood that duplicate parts are provided on the opposite side of the machine where necessary and particularly where indicated in Figure 1. In the drawings, corresponding parts have generally been identically numbered on the opposite sides of the machine.

It will be evident that I have provided a mowing mechanism assembly which may be rapidly and conveniently assembled onto the body of a conventional tractor, and one which may be easily removed when no longer required.

It will also be obvious that a mowing machine of this invention is capable of efficient and safe operation, and will not become damaged or disarranged even during heavy use.

I claim:

1. In combination with a tractor having a rear axle housing and a driving shaft, a mower frame including arms positioned to extend longitudinally of the tractor on each side thereof, each of said arms having a substantially horizontal rearward portion and a downwardly inclined forward portion terminating forwardly of the tractor, said rear axle housing having spaced depending brackets, transverse pins fixed to said brackets, the rear ends of said arms being tubular and provided with elongated slots, transverse pins fixed to said brackets, the rear ends of said arms being tubular and provided with elongated slots, said pins extending transversely through said slots so as to slidably connect the arms to the tractor and provide fixed pivots about which the arms may swing relative to the tractor, said tubular ends having abutments therein spaced forwardly of the pins, yieldable means in said tubular ends and confined between said abutments and said pins for normally urging the arms forwardly and for opposing rearward movement of said arms, a cutting assembly mounted across the front of the tractor and connected to the forward ends of said arms, and means connected to the forward ends of said arms and extending rearwardly thereof for raising and lowering said cutting assembly with respect to the ground.

2. In combination with a tractor having a rear axle housing and a driving shaft, a mower frame including arms positioned to extend longitudinally of the tractor on each side thereof, each of said arms having a substantially horizontal rearward portion and a downwardly inclined forward portion terminating forwardly of the tractor, said rear axle housing having spaced depending brackets, transverse pins fixed to said brackets, the rear ends of said arms being tubular and provided with elongated slots, transverse pins fixed to said brackets, the rear ends of said arms being tubular and provided with elongated slots, said pins extending transversely through said slots so as to slidably connect the arms to the tractor and provide fixed pivots about which the arms may swing relative to the tractor, said tubular ends having abutments therein spaced forwardly of the pins, yieldable means in said tubular ends and confined between said abutments and said pins for normally urging the arms forwardly and for opposing rearward movement of said arms, a cutting assembly mounted across the front of the tractor and connected to the forward ends of said arms, and means operatively connected to the drive shaft of the tractor and the forward ends of said arms for raising the latter around their pivots so as to elevate or lower said cutting assembly.

3. In combination with a tractor having a rear axle housing and a driving shaft, a mower frame including arms positioned to extend longitudinally of the tractor on each side thereof, each of said arms having a substantially horizontal rearward portion and a downwardly inclined forward portion terminating forwardly of the tractor, said rear axle housing having spaced depending brackets, transverse pins fixed to said brackets, the rear ends of said arms being tubular and provided with elongated slots, transverse pins fixed to said brackets, the rear ends of said arms being tubular and provided with elongated slots, said pins extending transversely through said slots so as to slidably connect the arms to the tractor and provide fixed pivots about which the arms may swing relative to the tractor, said tubular ends having abutments therein spaced forwardly of the pins, yieldable means in said tubular ends and confined between said abutments and said pins for normally urging the arms forwardly and for opposing rearward movement of said arms, a cutting assembly mounted across the front of the tractor and connected to the forward ends of said arms, manually operable means connected to the forward ends of said arms for raising and lowering the same about their pivots, and means operatively connected to the driving shaft and to the forward ends of said arms for raising and lowering the cutting assembly.

4. In combination with a tractor having a rear axle housing and a driving shaft, a mower frame including arms positioned to extend longitudinally of the tractor on each side thereof, each of said arms having a substantially horizontal rearward portion and a downwardly inclined forward portion terminating forwardly of the tractor, said rear axle housing having spaced depending brackets, transverse pins fixed to said brackets, the rear ends of said arms being tubular and provided with elongated slots, said pins extending transversely through said slots so as to slidably connect the arms to the tractor and provide fixed pivots about which the arms may swing relative to the tractor, said tubular ends having abutments therein spaced forwardly of the pins, yieldable means in said tubular ends and confined between said abutments and said pins for normally urging the arms forwardly and for opposing rearward movement of said arms, a cutting assembly mounted across the front of the tractor and connected to the forward ends of said arms, means operatively connected to said arms for raising and lowering the cutting assembly, means upon rearward displacement of said arms when the cutting assembly encounters a heavy object upon forward movement of the tractor for retaining the arms in their rearwardly displaced position, and means for releasing said retaining means.

CLYDE M. ANNIS.

REFERENCES CITED

The following references are of record in the file of this patent:

UNITED STATES PATENTS

| Number | Name | Date |
| --- | --- | --- |
| 1,280,373 | Beckner | Oct. 1, 1918 |
| 1,528,553 | Kennedy et al. | Mar. 3, 1925 |
| 2,065,901 | Leavitt | Dec. 29, 1936 |
| 2,340,488 | Paradise et al. | Feb. 1, 1944 |